(12) United States Patent
Sun et al.

(10) Patent No.: US 12,462,589 B2
(45) Date of Patent: Nov. 4, 2025

(54) TEXT LINE DETECTION

(71) Applicant: Microsoft Technology Licensing, LLC, Redmond, WA (US)

(72) Inventors: Lei Sun, Beijing (CN); Qiang Huo, Beijing (CN); Chixiang Ma, Beijing (CN); Zhuoyao Zhong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 17/783,250

(22) PCT Filed: Jan. 17, 2020

(86) PCT No.: PCT/CN2020/072700
§ 371 (c)(1),
(2) Date: Jun. 7, 2022

(87) PCT Pub. No.: WO2021/142765
PCT Pub. Date: Jul. 22, 2021

(65) Prior Publication Data
US 2023/0036812 A1   Feb. 2, 2023

(51) Int. Cl.
*G06V 20/62* (2022.01)
*G06F 40/30* (2020.01)
(Continued)

(52) U.S. Cl.
CPC .............. *G06V 20/63* (2022.01); *G06F 40/30* (2020.01); *G06V 30/153* (2022.01); *G06V 30/18133* (2022.01); *G06V 30/274* (2022.01)

(58) Field of Classification Search
CPC ................. G06V 20/63; G06V 30/153; G06V 30/18133; G06V 30/274; G06V 10/454;
(Continued)

(56) References Cited

U.S. PATENT DOCUMENTS 9,076,056 B2  7/2015  Wang et al.
9,367,736 B1  6/2016  Senechal et al.
(Continued)

FOREIGN PATENT DOCUMENTS

CN  108133209 A  6/2018
CN  108304761 A  7/2018
(Continued)

OTHER PUBLICATIONS

Yao et al. ("Scene Text Detection via Holistic, Multi-Channel Prediction," arXiv:1606.09002, published Jun. 28, 2016). (Year: 2016).*
(Continued)

*Primary Examiner* — Wassim Mahrouka
(74) *Attorney, Agent, or Firm* — Schwegman Lundberg & Woessner, P.A.

(57) ABSTRACT

Implementations of the present disclosure provide a solution for text line detection. In this solution, a first text region comprising a first portion of at least a first text element and a second text region comprising a second portion of at least a second text element are determined from an image. A first feature representation is extracted from the first text region and a second feature representation is extracted from the second text region. The first and second feature representations comprise at least one of an image feature representation or a semantic feature representation of the image. A link relationship between the first and second text regions can then be determined based at least in part on the first and second feature representations. The link relationship can indicate whether the first and second portions of the first and second text elements are located in a same text line. In this way, by detecting text regions and determining the link relationship thereof based on their feature representations,
(Continued)

the accuracy and efficiency for detecting text lines in various images can be improved

20 Claims, 5 Drawing Sheets

(51) Int. Cl.
 *G06V 30/148* (2022.01)
 *G06V 30/18* (2022.01)
 *G06V 30/262* (2022.01)
(58) Field of Classification Search
 CPC ...... G06V 10/513; G06V 10/82; G06V 20/62; G06F 40/30
 See application file for complete search history.

(56) References Cited

U.S. PATENT DOCUMENTS

| | | | |
|---|---|---|---|
| 10,339,657 | B2 | 7/2019 | Tonouchi et al. |
| 2016/0026899 | A1* | 1/2016 | Wang ................ G06F 18/2163 382/176 |
| 2016/0092745 | A1 | 3/2016 | Wada et al. |
| 2016/0125275 | A1* | 5/2016 | Hamada ............... G06F 40/205 382/229 |
| 2019/0019052 | A1* | 1/2019 | Pao ...................... G06V 30/413 |
| 2021/0201182 | A1* | 7/2021 | Li ......................... G06N 3/047 |

FOREIGN PATENT DOCUMENTS

| | | |
|---|---|---|
| CN | 103577818 B | 9/2018 |
| CN | 110084240 A | 8/2019 |
| CN | 110135411 A | 8/2019 |
| CN | 110147786 A | 8/2019 |

OTHER PUBLICATIONS

Akkiraju, et al., "Alpha Shapes: Definition and Software", In Proceedings of the 1st International Computational Geometry Software Workshop, vol. 63, Issue 66, Jan. 20, 1995, 4 Pages.
Bissacco, et al., "PhotoOCR: Reading Text in Uncontrolled Conditions", In Proceedings of the IEEE International Conference on Computer Vision, Dec. 1, 2013, pp. 785-792.
Chan, et al., "Total-Text: A Comprehensive Dataset for Scene Text Detection and Recognition", In Proceedings of 14th IAPR International Conference on Document Analysis and Recognition, Nov. 9, 2017, pp. 935-942.
Dai, et al., "Detecting Visual Relationships With Deep Relational Networks", In Proceedings of the IEEE Conference on Computer Vision and Pattern Recognition, Jul. 21, 2017, pp. 3076-3086.
Dai, et al., "Fused Text Segmentation Networks for Multi-oriented Scene Text Detection", In Proceedings of the 24th International Conference on Pattern Recognition, Aug. 20, 2018, pp. 3604-3609.
Deng, et al., "PixelLink: Detecting Scene Text via Instance Segmentation", In Proceedings of the AAAI Conference on Artificial Intelligence, vol. 32, Issue 1, Apr. 27, 2018, pp. 6773-6780.
Epshtein, et al., "Detecting Text in Natural Scenes with Stroke Width Transform", In Proceedings of the Twenty-Third IEEE Conference on Computer Vision and Pattern Recognition, Jun. 13, 2010, pp. 2963-2970.
Fabrizio, et al., "TextCatcher: A Method to Detect Curved and Challenging Text in Natural Scenes", In International Journal on Document Analysis and Recognition, vol. 19, Issue 2, Mar. 11, 2016, pp. 99-117.
Girshick, et al., "Detectron", Retrieved from: https://web.archive.org/web/20180122230125/https://github.com/facebookresearch/Detectron, Jan. 22, 2018, 3 Pages.
Girshick, Ross, "FasT R-CNN", In Proceedings of the IEEE International Conference on Computer Vision, Dec. 7, 2015, pp. 1440-1448.

Gupta, et al., "Synthetic Data for Text Localisation in Natural Images", In Proceedings of the IEEE Conference on Computer Vision and Pattern Recognition, Jun. 26, 2016, pp. 2315-2324.
He, et al., "Aggregating Local Context for Accurate Scene Text Detection", In Proceedings of 13th Asian Conference on Computer Vision, Nov. 20, 2016, pp. 280-296.
He, et al., "Deep Direct Regression for Multi-Oriented Scene Text Detection", In Proceedings of the IEEE International Conference on Computer Vision, Oct. 22, 2017, pp. 745-753.
He, et al., "Deep Residual Learning for Image Recognition", In Proceedings of the IEEE Conference on Computer Vision and Pattern Recognition, Jun. 27, 2016, pp. 770-778.
He, et al., "Mask R-CNN", In Proceedings of the IEEE International Conference on Computer Vision, Oct. 22, 2017, pp. 2980-2988.
Hu, et al., "WordSup: Exploiting Word Annotations for Character Based Text Detection", In Proceedings of the IEEE International Conference on Computer Vision, Oct. 22, 2017, pp. 4940-4949.
Huang, et al., "DenseBox: Unifying Landmark Localization with End to End Object Detection", In Repository of arXiv:1509.04874v1, Sep. 16, 2015, 13 Pages.
Huang, et al., "Mask R-CNN With Pyramid Attention Network for Scene Text Detection", In Proceedings of IEEE Winter Conference on Applications of Computer Vision, Jan. 7, 2019, pp. 764-772.
Jaderberg, et al., "Reading Text in the Wild with Convolutional Neural Networks", In International Journal of Computer Vision, vol. 116, Issue 1, May 7, 2015, 20 Pages.
Liao, et al., "Rotation-Sensitive Regression for Oriented Scene Text Detection", In Proceedings of the IEEE Conference on Computer Vision and Pattern Recognition, Jun. 18, 2018, pp. 5909-5918.
Liao, et al., "TextBoxes: A Fast Text Detector with a Single Deep Neural Network", In Proceedings of the Thirty-First AAAI Conference on Artificial Intelligence, vol. 31, Issue 1, Feb. 12, 2017, pp. 4161-4167.
Lin, et al., "Feature Pyramid Networks for Object Detection", In Proceedings of the IEEE Conference on Computer Vision and Pattern Recognition, Jul. 21, 2017, pp. 2117-2125.
Liu, et al., "Correlation Propagation Networks for Scene Text Detection", In Repository of arXiv:1810.00304v1, Sep. 30, 2018, 12 Pages.
Liu, et al., "Deep Matching Prior Network: Toward Tighter Multioriented Text Detection", In Proceedings of the IEEE Conference on Computer Vision and Pattern Recognition, Jul. 21, 2017, pp. 3454-3461.
Liu, et al., "Detecting Curve Text in the Wild: New Dataset and New Solution", In Repository of arXiv:1712.02170v1, Dec. 6, 2017, 9 Pages.
Liu, et al., "Detecting Text in the Wild with Deep Character Embedding Network", In Proceedings of the 14th Asian Conference on Computer Vision, Dec. 2, 2018, pp. 501-517.
Liu, et al., "FOTS: Fast Oriented Text Spotting with a Unified Network", In Proceedings of IEEE/CVF Conference on Computer Vision and Pattern Recognition, Jun. 18, 2018, pp. 5676-5685.
Long, et al., "Textsnake: A Flexible Representation for Detecting Text of Arbitrary Shapes", In Proceedings of the 15th European Conference on Computer Vision, Sep. 8, 2018, pp. 19-35.
Lu, et al., "Visual Relationship Detection with Language Priors", In Proceedings of the 14th European Conference on Computer Vision, Oct. 11, 2016, pp. 852-869.
Lyu, et al., "Mask TextSpotter: An End-to-End Trainable Neural Network for Spotting Text with Arbitrary Shapes", In Proceedings of 15th European Conference on Computer Vision, Sep. 8, 2018, pp. 71-88.
Lyu, et al., "Multi-Oriented Scene Text Detection via Corner Localization and Region Segmentation", In Proceedings of the IEEE Conference on Computer Vision and Pattern Recognition, Jun. 18, 2018, pp. 7553-7563.
Ma, et al., "Arbitrary-Oriented Scene Text Detection via Rotation Proposals", In Journal of the IEEE Transactions on Multimedia, vol. 20, Issue 11, Nov. 2018, pp. 3111-3122.
Ma, et al., "Scene Text Detection Based on Pruning Strategy of Mser-Trees and Linkage-Trees", In Proceedings of IEEE International Conference on Multimedia and Expo, Jul. 10, 2017, pp. 367-372.

(56) References Cited

OTHER PUBLICATIONS

Neumann, et al., "A Method for Text Localization and Recognition in Real-World Images", In Proceedings of the 10th Asian Conference on Computer Vision, Nov. 8, 2010, pp. 770-783.
"International Search Report and Written Opinion Issued in PCT Application No. PCT/CN20/072700", Mailed Date: Jul. 29, 2020, 9 Pages.
Qin, et al., "An Algorithm for Scene Text Detection Using Multibox and Semantic Segmentation", In Journal of Applied Sciences, vol. 9, Issue 6, Mar. 13, 2019, 13 Pages.
Ren, et al., "Faster R-CNN: Towards Real-Time Object Detection with Region Proposal Networks", In Journal of Advances in Neural Information Processing Systems, Dec. 7, 2015, 9 Pages.
Risnumawan, et al., "A Robust Arbitrary Text Detection System for Natural Scene Images", In Journal of Expert Systems with Applications, vol. 41, Issue 18, Dec. 15, 2014, pp. 8027-8048.
Rong, et al., "Recognizing Text-Based Traffic Guide Panels with Cascaded Localization", In Proceedings of European Conference on Computer Vision, Oct. 8, 2016, pp. 109-121.
Shi, et al., "Detecting Oriented Text in Natural Images by Linking Segments", In Proceedings of the IEEE Conference on Computer Vision and Pattern Recognition, Jul. 21, 2017, pp. 3482-3490.
Shivakumara, et al., "Detection of Curved Text in Video: Quad Tree Based Method", In Proceedings of the 12th International Conference on Document Analysis and Recognition, Aug. 25, 2013, pp. 594-598.
Sun, et al., "A Robust Approach for Text Detection from Natural Scene Images", In Journal of Pattern Recognition, vol. 48, Issue 9, Sep. 2015, pp. 2906-2920.
Sun, et al., "TextNet: Irregular Text Reading from Images with an End-to-End Trainable Network", In Proceedings of the 14th Asian Conference on Computer Vision, Dec. 2, 2018, pp. 83-99.
Tang, et al., "SegLink++: Detecting Dense and Arbitrary-shaped Scene Text by Instance-aware Component Grouping", In Journal of Pattern Recognition, vol. 96, Dec. 2019, 4 Pages.
Tian, et al., "Detecting Text in Natural Image with Connectionist Text Proposal Network", In Proceedings of European Conference on Computer Vision, Oct. 11, 2016, pp. 56-72.
Tsai, et al., "Mobile Visual Search on Printed Documents using Text and Low Bit-Rate Features", In Proceedings of the 18th IEEE International Conference on Image Processing, Sep. 11, 2011, pp. 2601-2604.
Wang, et al., "Shape Robust Text Detection with Progressive Scale Expansion Network", In Repository of arXiv:1806.02559v1, Jun. 7, 2018, 12 Pages.
Wu, et al., "Self-Organized Text Detection With Minimal Post-Processing via Border Learning", In Proceedings of the IEEE International Conference on Computer Vision, Oct. 22, 2017, pp. 5000-5009.
Xie, et al., "Scene Text Detection with Supervised Pyramid Context Network", In Proceedings of the AAAI Conference on Artificial Intelligence, vol. 33, Issue 01, Jul. 17, 2019, pp. 9038-9045.
Xu, et al., "TextField: Learning A Deep Direction Field for Irregular Scene Text Detection", In Repository of arXiv:1812.01393v1, Dec. 4, 2018, 12 Pages.
Zhu, et al., "TextMountain: Accurate Scene Text Detection via Instance Segmentation", In Repository of arXiv:1811.12786v1, Nov. 30, 2018, 12 Pages.
Yao, et al., "A Unified Framework for Multioriented Text Detection and Recognition", In Journal of IEEE Transactions on Image Processing, vol. 23, Issue 11, Nov. 2014, pp. 4737-4749.
Yao, et al., "Detecting Texts of Arbitrary Orientations in Natural Images", In Proceedings of IEEE Conference on Computer Vision and Pattern Recognition, Jun. 16, 2012, pp. 1083-1090.
Yao, et al., "Scene Text Detection via Holistic, Multi-Channel Prediction", In Repository of arXiv:1606.09002v1, Jun. 29, 2016, 10 Pages.
Yin, et al., "Robust Text Detection in Natural Scene Images", In Journal of IEEE Transactions on Pattern Analysis and Machine Intelligence, vol. 36, Issue 5, May 2014, pp. 970-983.
Zhang, et al., "Multi-Oriented Text Detection with Fully Convolutional Networks", In Proceedings of the IEEE Conference on Computer Vision and Pattern Recognition, Jun. 27, 2016, pp. 4159-4167.
Zhang, et al., "Relationship Proposal Networks", In Proceedings of the IEEE Conference on Computer Vision and Pattern Recognition, Jul. 21, 2017, pp. 5678-5686.
Zhong, et al., "An Anchor-Free Region Proposal Network for Faster R-CNN based Text Detection Approaches", In Repository of arXiv:1804.09003v1, Apr. 24, 2018, 8 Pages.
Zhou, et al., "EAST: An Efficient and Accurate Scene Text Detector", In Proceedings of IEEE Conference on Computer Vision and Pattern Recognition, Jul. 21, 2017, pp. 2642-2651.
Zhu, et al., "Sliding Line Point Regression for Shape Robust Scene Text Detection", In Proceedings of the 24th International Conference on Pattern Recognition, Aug. 20, 2018, pp. 3735-3740.
Ma, et al., "A Relation Network Based Approach to Curved Text Detection", In Proceedings of International Conference on Document Analysis and Recognition, Sep. 20, 2019, pp. 707-713.
"Extended European Search Report Issued in European Patent Application No. 20913824.7", Mailed Date: Jun. 23, 2023, 7 Pages.
Ma, et al., "A relation network-based approach to curved text detection," 2019 International Conference on Document Analysis and Recognition, Sep. 9, 2019, pp. 707-713.
Office Action Received for Chinese Application No. 202080093448. 6, mailed on May 30, 2024, 15 pages (English Translation Provided).
Notice to Grant Received for China Application No. 202080093448. 6, mailed on Oct. 29, 2024, 7 pages.
Communication pursuant to Article 94(3) EPC, Received for European Application No. 20913824.7, mailed on Mar. 26, 2025, 7 pages.
Communication pursuant to Rules 70(2) and 70a (2) received in European Application No. 20913824.7, mailed on Jul. 11, 2023, 1 page.
Examination report Received for Indian Application No. 202217039800, mailed on Apr. 16, 2025, 6 pages.

* cited by examiner

TEXT LINE DETECTION

CROSS-REFERENCE TO RELATED APPLICATION

This application is a U.S. National Stage Filing under 35 U.S.C. 371 of International Patent Application Serial No. PCT/CN2020/072700, filed Jan. 17, 2020, and published as WO 2021/142765 A1 on Jul. 22, 2021, which application and publication are incorporated herein by reference in their entirety.

BACKGROUND

The technology of detecting and recognizing text lines in images is being widely used in a lot of real-world applications such as text recognition, text translation, and image tagging. A text line in an image refers to a set of characters and/or symbols which are spatially related or semantically related. For example, a user may capture an image with text using his/her smartphone and may expect text lines in the image to be recognized. Compared to text line detection in well-captured document images (such as scanned versions of documents), text line detection in images capturing natural scenes is a much more challenging job due to the huge amount of diversity in both text appearance and surrounding backgrounds in the images. For example, text lines in natural scene images may be in any orientation and may vary dramatically in font, size, color, and so on. Therefore, it is desired to improve accuracy and efficiency for text line detection in images.

SUMMARY

In accordance with implementations of the subject matter described herein, there is provided a solution for text line detection. In this solution, a first text region comprising a first portion of at least a first text element and a second text region comprising a second portion of at least a second text element are determined from an image. A first feature representation is extracted from the first text region and a second feature representation is extracted from the second text region. The first and second feature representations comprise at least one of an image feature representation or a semantic feature representation of the textual content contained in the image. A link relationship between the first and second text regions can then be determined based at least in part on the first and second feature representations. The link relationship can indicate whether the first and second portions of the first and second text elements are located in a same text line. In this way, by detecting text regions and determining the link relationship thereof based on their feature representations, the accuracy and efficiency for detecting text lines in various images can be improved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Example Environment

Text line detection is now playing an important role in many content-based visual intelligent applications, such as image retrieval, autonomous driving, OCR translation and/or the like. A conventional text line detection technology might be well applied to a well-captured document image. However, these conventional text line detection methods are not performing well in images of natural scenes due to the huge amount of diversity in both text appearance and surrounding backgrounds in these images. A good text line detection solution should be able to robustly detect text lines in any language and any orientation from both scanned document images and natural scene images. However, due to the huge amount of diversity in both text appearance and surrounding backgrounds, none of existing text detection methods, including both the top-down and bottom-up approaches, can achieve this goal. In implementations of the subject matter described herein, there is provided a solution for universal text line detection.

Figure 1:
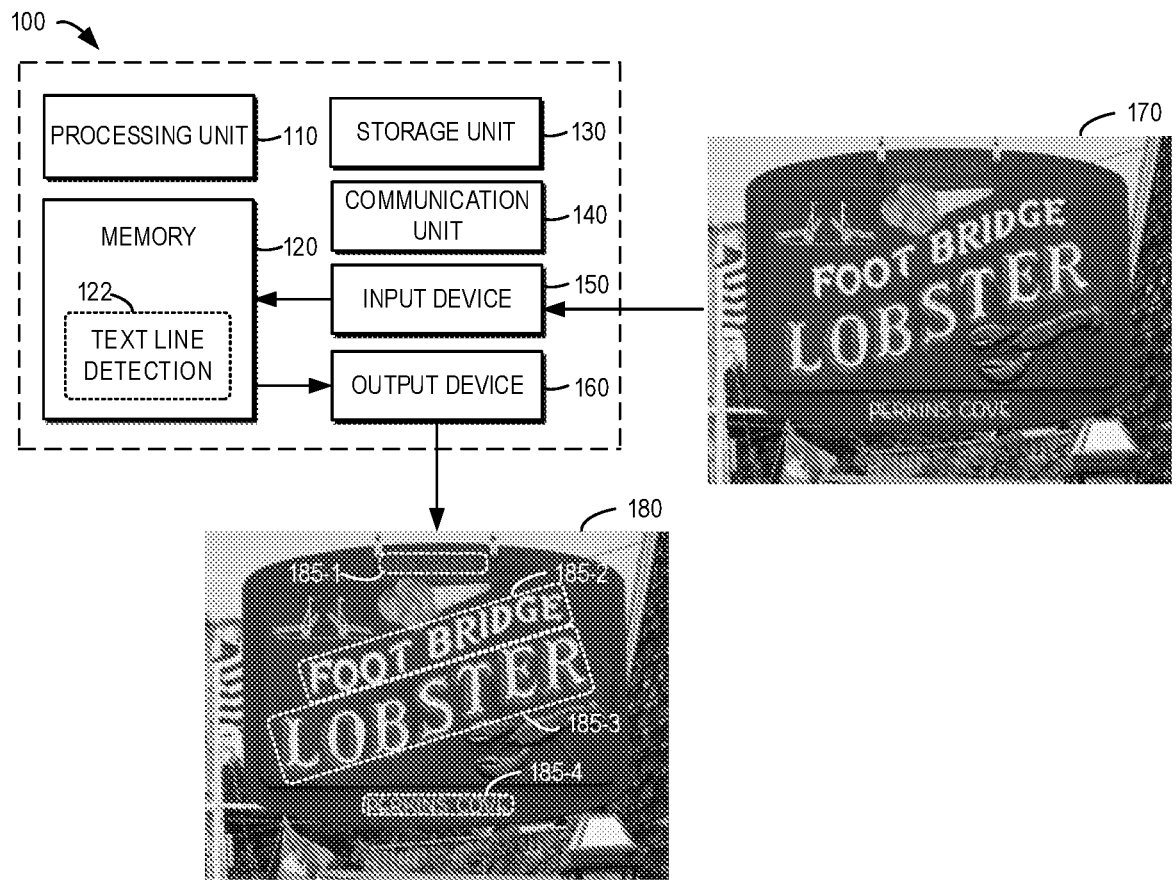
FIG. 1 illustrates a block diagram of a computing device in which various implementations of the subject matter described herein can be implemented.

FIG. 1 illustrates a block diagram of a computing device 100 in which various implementations of the subject matter described herein can be implemented. It would be appreciated that the computing device 100 shown in FIG. 1 is merely for purpose of illustration, without suggesting any limitation to the functions and scopes of the implementations of the subject matter described herein in any manner. As shown in FIG. 1, the computing device 100 includes a general-purpose computing device 100. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, multiple processing units execute computer executable instructions in parallel so as to improve the parallel processing capability of the computing device 100. The processing unit 110 may also be referred to as a central processing unit (CPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 130 may be any detachable or non-detachable medium and may include a machine-readable medium such as a memory, flash memory drive, magnetic disk or another other media, which can be used for storing information and/or data and can be accessed in the computing device 100.

The computing device 100 may further include additional detachable/non-detachable, volatile/non-volatile memory medium. Although not shown in FIG. 1, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 140 communicates with a further computing device via the communication medium. In addition, the functions of the components in the computing device 100 can be implemented by a single computing cluster or multiple computing machines that can communicate via communication connections. Therefore, the computing device 100 can operate in a networked environment using a logical connection with one or more other servers, networked personal computers (PCs) or further general network nodes.

The input device 150 may be one or more of a variety of input devices, such as a mouse, keyboard, tracking ball, voice-input device, and the like. The output device 160 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some implementations, as an alternative of being integrated in a single device, some or all components of the computing device 100 may also be arranged in cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 100 may be used to implement text line detection in implementations of the subject matter described herein. Therefore, hereinafter, the computing device 100 is also referred to as a "text line detection device." The memory 120 may include one or more text line detection modules 122 having one or more program instructions. These modules are accessible and executable by the processing unit 110 to perform the functionalities of the various implementations described herein.

To implement text line detection, the computing device 100 can receive an image 170 through the input device 150. The text line detection module 122 performs text line detection on the image 170 and may determine one or more text line regions 185. The text line detection module 122 may further determine the coordinates of the bounding boxes of text line regions 185 in the image 170. In some embodiments, the output device 160 may output a file comprising the coordinates of bounding box for each of the detected text line regions 185. In some embodiments, for purpose of visualization, the text line detection module 122 may further generate an updated image 180 with the bounding boxes of the detected text line regions 185 being highlighted for indicating that text elements included the text line region 185 are located in a same text line. The output device 160 may for example present the updated image 180 to a user.

As used herein, a "text element" refers to an element used for presenting textual or graphic information. Examples of a "text element" may include but are not limited to a character or a symbol, such as an English letter, Chinese character, punctuation, or graphic mark, and the like. In some cases, a "text element" may also be referred to as a "text instance".

As used herein, a "text region" refers to a region of an image which is detected as including at least a portion of at least a text element. In some cases, a "text region" may also be referred to as a "text primitive". For example, a text region may include a half portion of a text element, a full text element, a number of full text elements or multiple portions of different text elements. As used herein, a "text line" refers to a set of text elements which form a line in an image according to their spatial and/or semantic relationship. As used herein, a "text line region" refers to a region of an image bounding at least portions of the set of text elements which are determined as locating in a same text line.

It should be appreciated that the image and text line region illustrated in FIG. 1 are for purpose of illustration only. In other examples, any image may be processed and any text line region may be determined accordingly.

Roughly speaking, there are two types of conventional deep learning based text line detection solutions, namely top-down approaches and bottom-up approaches. The top-down approaches are not robust to nearby long skewed/curved text lines. The bottom-up approaches either predict a pixel-level text score map or detect candidate text segments firstly, and then use different methods to group detected text segments or text pixels into text lines and calculate the corresponding bounding boxes. The pixel-based methods cannot detect text-lines with large inter-character distances robustly. The line grouping methods used by text segment based methods are not robust so that these methods can hardly be applied to images where text elements included therein are organized in irregular ways. (Here, the limitations of the segment based methods and the pixel-based methods are different.)

Work Principle and Example Structure for Implementing Text Line Detection

According to implementations of the subject matter described herein, a solution for text line detection is proposed. In this solution, text regions including at least a portion of a text element are detected. The link relationship between a pair of text regions is further determined based on feature representations extracted from the pair of text regions. The link relationship may indicate whether the text elements included in the pair of text regions are located in a same text line. In this way, by detecting text regions and determining the link relationship thereof based on their feature representations, the accuracy and efficiency for detecting text lines in various images can be improved.

The basic principles and several example implementations of the subject matter described herein are described below with reference to the figures.

Figure 2:
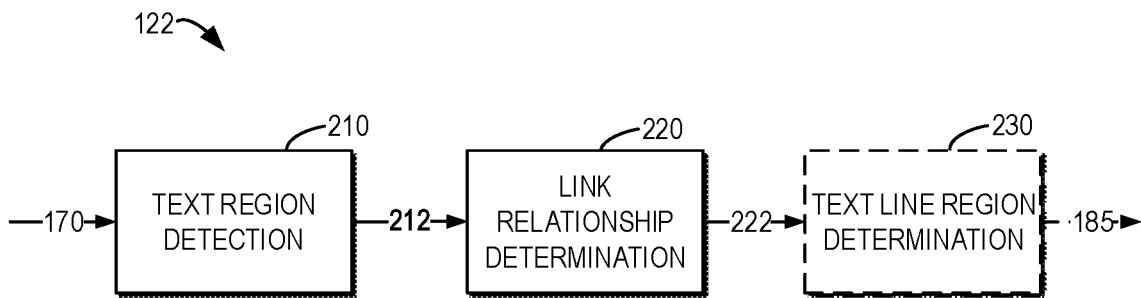
FIG. 2 illustrates a flowchart of a process for text line detection according to an implementation of the subject matter described herein.

Reference is first made to FIG. 2, which illustrates a block diagram of a text line detection module according to an implementation of the subject matter described herein. For purpose of illustration, the text line detection module 122 in the computing device 100 of FIG. 1 is referred as an example for implementing text line detection described herein. The text line detection module 122 includes a plurality of modules for implementing a plurality of stages in detecting one or more text lines in an image.

The text line detection process can be implemented using the text line detection module 122 in FIG. 2. As shown, the text line detection module 122 includes a text region detection phase or module 210 and a link relationship determination phase or module 220. In some implementations, the text line detection module 122 may further include a text line region determination phase or module 230.

In some implementations, an image 170 may be provided as an input of the text region detection module 210. The text region detection module 210 may determine a plurality of text regions 212 in the image 170, for example, by using a machine learning technology. Each determined text region 212 in the image 170 may include at least a portion of a text element.

For example, the text region detection module 210 may first determine a plurality of candidate regions according to a sliding window, and then obtain a feature map of each of the plurality of candidate regions. The feature map can then be input into a machine learning model to determine whether the corresponding candidate region is a text region or not. It should be understood that the particular text region discussed above is only for purpose of illustration. Any approaches for automated or manual-assisted text region detection, either currently used or to be developed in the future, can be employed to detect text regions in the image 170.

With the plurality of text regions 212 determined, the link relationship determination module 220 is configured to detect a link relationship 222 between a pair of text regions among the plurality of text regions 212. The link relationship 222 may indicate whether text element(s) or portion(s) of text element(s) included in the pair of text regions locate is in a same text line. In some implementations, the link relationship determination module 220 can first extract corresponding feature representation from the pair of text regions, respectively. The link relationship 222 between the pair of text regions can then be determined based on the extracted feature representations using a machine learning model. The determination of the link relationship based on the extracted feature representations will be discussed in detail below.

In some implementations, the text line detection module 122 may further include text line region determination phrase or module 230. The result of the link relationship determination module 220, i.e., the link relationship between text regions, is provided to the text line region determination phrase or module 230. The text line region determination phrase or module 230 is configured to determine which of the text regions 212 locate in a same text line according to the link relationship, and then determine a text line region 185 in the image 170 bounding these text regions. The process in the text line region determination 230 will be discussed in detail below.

In some implementations, the result of the text line region determination module 230, i.e., the determined text line region(s) 185, may be further used for other purposes, such as for text recognition, mobile search, text translation, and so on. For example, the text line region 185 may be provided to an image-based text recognition module for recognizing the specific text presented in the text line region 185. Alternatively, or in addition, an updated image 180 may be generated with the bounding box of the determined text line region(s) being highlighted in the updated image 180. For example, by clearly presenting the determined text line regions for example to a developer, it could be clearly showed whether the text line detected by the text line detection module 230 is accurate.

It would be appreciated that the modules in FIG. 2 may be implemented as one or more software engines, hardware components or combination thereof, or the like, which are configured with logic for implementing the functionality attributed to the particular module. Each module may be implemented using one or more of such software engines, hardware components or the like. The software engines and the like are executed on one or more processors of one or more computing systems or devices and utilize or operate on data stored in one or more storage devices, memories, or the like, on one or more of the computing systems. In some implementations, different modules in FIG. 2 may be implemented as a single module, and a single module in FIG. 2 may be separated as more than one module. In some implementations, one or more further modules may be included into the text line detection module 122.

Text Region Detection

To detect one or more text regions in the image 170, the text region detection module 122 may determine a plurality of candidate regions for example according to a sliding-window based scheme. In some implementations, for detecting text elements with various sizes, the text region detection module 122 may use different sizes of sliding windows for detecting candidate regions of corresponding sizes from the image 170.

Figure 3:
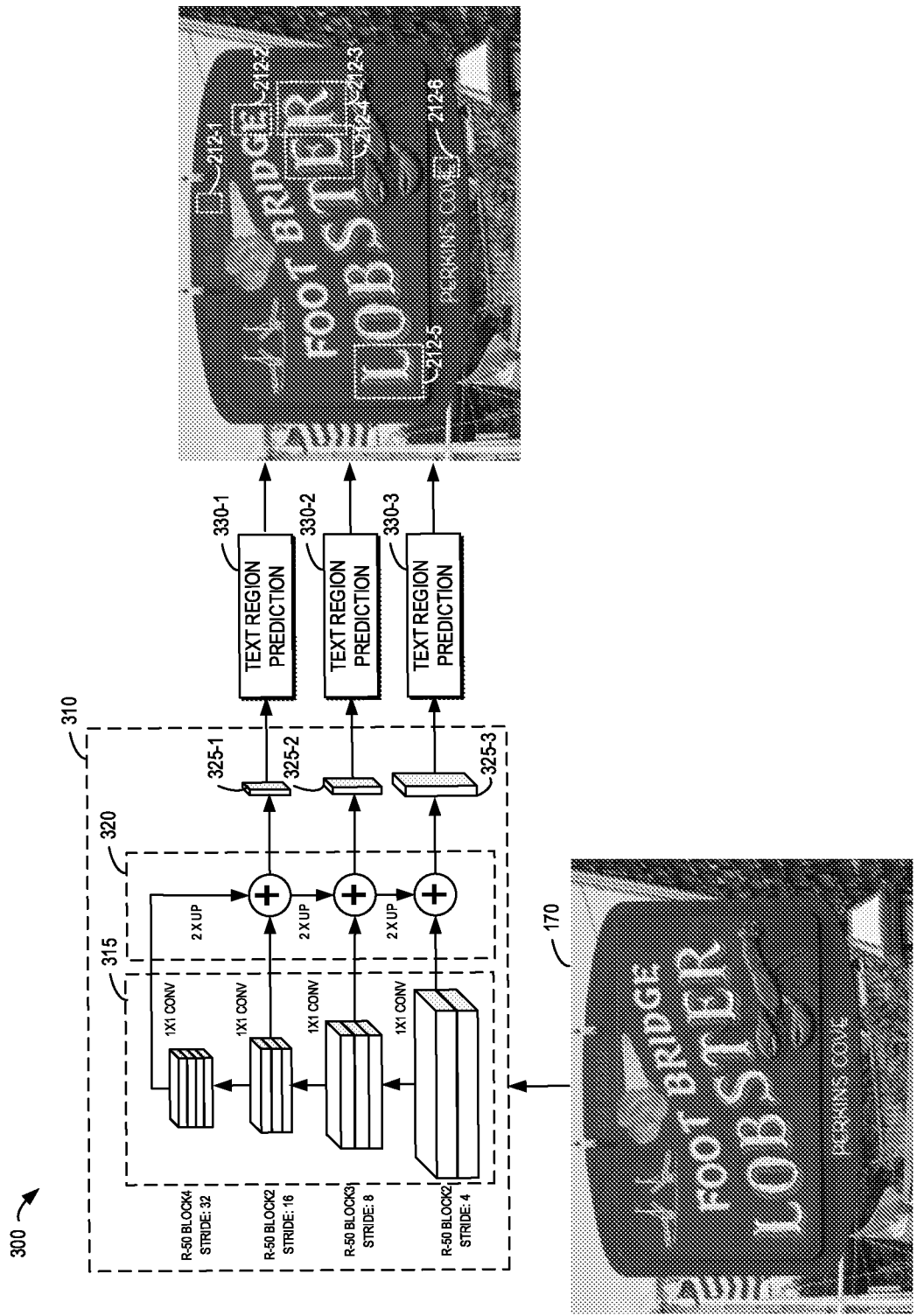
FIG. 3 illustrates an example structure of the text region detection module according to an implementation of the subject matter described herein.

FIG. 3 illustrates an example stricter 300 of the text region detection module 210 according to an implementation of the subject matter described herein. In the example of FIG. 3, a Feature Pyramid Network (FPN) is utilized for feature extraction. Specifically, the image 170 is provided as an input to an FPN 310 for generating feature maps with different sizes. The FPN 310 has two pathways, i.e., a bottom-up pathway 315 and a top-down pathway 320. The bottom-up pathway 315 is the feed-forward computation of the backbone ConvNet, which computes a feature hierarchy consisting of feature maps at several scales with a scaling step of 2. In the example of FIG. 3, a 4-level feature pyramid is included, whose stripe are 4, 8, 16 and 32 pixels, respectively. The top-down pathway 320 generates higher-resolution features by up-sampling spatially coarser but semantically stronger feature maps from higher pyramid levels. These features are then enhanced with features from the bottom-up pathway via lateral connections. It should be known that the specific parameters (e.g., number of levels, stripes and so on) relating to FPN are merely for purpose of illustration, and any proper model parameters could be applied.

As shown in FIG. 3, three scale-specific text region prediction modules 330-1, 330-2 and 330-3 (individually or collectively referred to as text region prediction module 330 herein) are configured to receive feature maps 325-1, 325-2 and 325-3 (individually or collectively referred to as feature map 325 herein) and are designed to detect small (e.g., 4px-23px), medium (e.g., 24px-48px) and large (e.g., >48px) text elements, respectively. In some implementations, a Region Proposal Network (RPN) may be applied in each of the text region prediction modules 330-1, 330-2 and 330-3. For example, the text region prediction modules 330-1, 330-2 and 330-3 may apply an anchor-free RPN to perform a dense per-pixel prediction of text elements.

For example, if a pixel on a pyramid level locates in the core region of a text element on that pyramid level, the corresponding text region prediction module 330 may mark this pixel as a "text" pixel, and directly predict the offsets from it to the vertices of its corresponding quadrilateral text region. In some implementations, each of the text region prediction modules 330 may be implemented as a 3×3 convolutional layer followed by two sibling 1×1 convolutional layers for text/non-text classification and quadrilateral bounding box regression, respectively.

In some implementations, the text region prediction module 330 may first generate a score (e.g., 0 to 1) for each of the candidate regions, wherein the score may represent a probability that the corresponding candidate region is a text region. The text region prediction modules 330 may then determine the corresponding text regions 212 in the image 170 by comparing the score of each candidate region with a score threshold (e.g., 0.85). As such, the candidate regions with a score higher than the threshold are to be determined as text regions. For example, as shown in FIG. 3, two small text regions 212-1 and 212-6 may be determined by the text region prediction module 330-1, a medium text region 212-2 may be determined by the text region prediction module 330-2, and three text regions 212-3, 212-4 and 212-5 may be determined by the text region prediction module 330-3.

As shown in FIG. 3, the text region 212-1 includes a character "M" with a relative small size, and the text region 212-3 includes a character "R" with a relative large size. It should be appreciated that the text regions 312-1, 312-2, 312-3, 312-4, 312-5 and 312-6 are shown in FIG. 3 for purpose of illustration, and there can be other text regions 212 determined by the text region prediction modules 330 which are not shown in FIG. 3. Though the text regions shown in FIG. 3 only include a full character, it should be understood that a text region may also include a portion of a character, a symbol, a portion of a symbol, multiple characters, multiple symbols, combination of character(s) and symbol(s) and the like.

It should be noted that the FPN 310 and RPN include in text region prediction module 330 may be trained together for determining different sizes of text regions in an image. The total loss in the joint training may be determined by calculating a sum of the loss of the models applied in the scale-specific text region prediction modules 330.

The particular structure of the text region detection module 210 as discussed above is merely for example, and is not intended to limit the scope of the subject matter. Any other proper structure for text region detection module can be employed to detect text regions in the image 170.

Link Relationship Determination

With the text regions 212 determined by the text region detection module 122, the link relationship determination module 220 can first select a first and second text regions from the plurality of text regions. Continuing with the example of FIG. 3, the link relationship determination module 220 may traverse all of the text regions 212 determined by the text region detection module 122.

Figure 4:
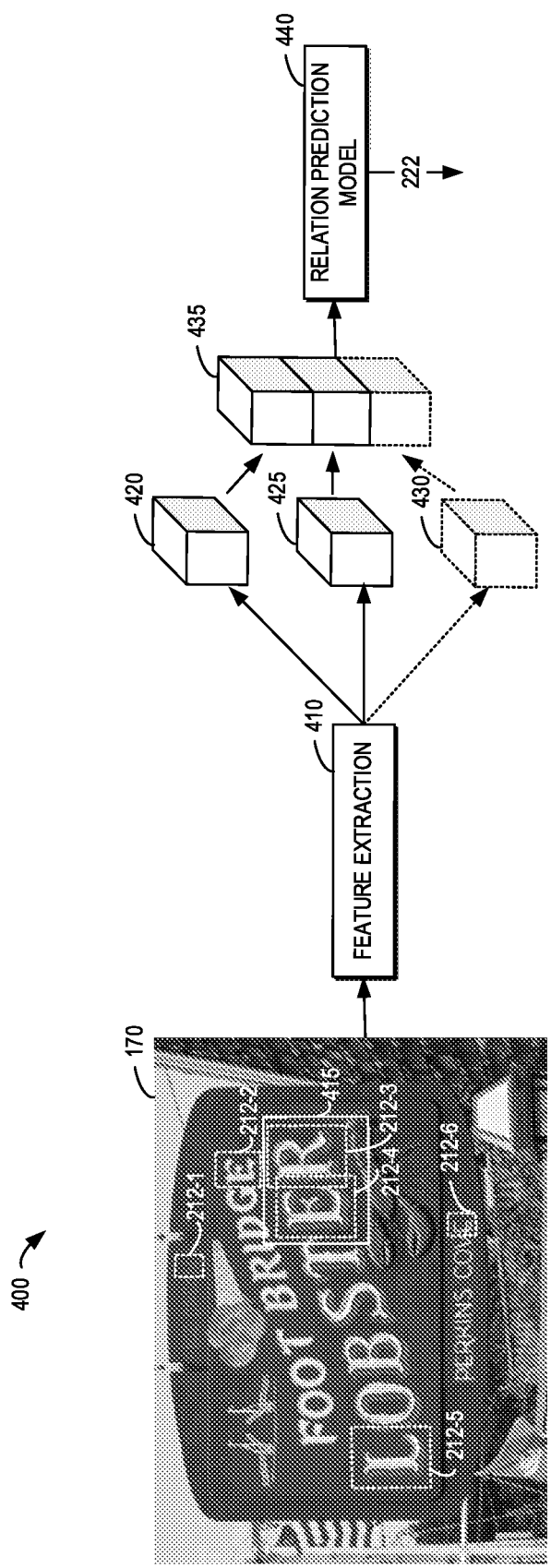
FIG. 4 illustrates an example structure of link relationship determination module according to an implementation of the subject matter described herein.

In some implementations, the link relationship determination module 220 may determine a link relationship between a text region 212 with another text region 212. The process of the link relationship determination will now be discussed with reference to FIG. 4. FIG. 4 illustrates an example structure 400 of the link relationship determination module 220 according to an implementation of the subject matter described herein.

As shown, the link relationship determination module 220 includes a feature extraction module 410 configured to extract feature representations from a pair of text regions and a relation prediction model 440 configured to determine the link relationship between the pair of text regions.

Take the text region 212-3 shown in FIG. 4 as an example of the first text region. In some implementations, the link relationship determination module 220 may determine the link relationship between the text region 212-3 and each of the other text regions.

Alternatively, considering that sizes of text elements in a same text line should be similar, the feature extraction module 410 may select a second text region from the other text regions by determining whether a difference between a first size of the text region 212-3 and a size of another text region is below a size threshold. Upon determining that the size difference is below the size threshold, the feature extraction module 410 may proceed with extracting feature representations from the pair of text regions. Otherwise, the feature extraction module 410 may ignore the pair of text regions.

For example, with regard to text region 212-3 in FIG. 4, the feature extraction module 410 may determine that the size difference between the text regions 212-2 and 212-3 exceeds a size threshold. Accordingly, the pair of text regions 212-2 and 212-3 may be ignored by the feature extraction module 410. In contrast, as shown in FIG. 4, a size of the text region 212-4 is similar to the size of the text region 212-3, and thus the feature representations of the two text regions may then be extracted by the feature extraction module 410. In this way, the efficiency of determining link relationship could be improved by decreasing unnecessary calculation.

Alternatively or additionally, considering that a distance between two neighbor text regions should not be too large, the feature extraction module 410 may select a second text region from the other text regions by determining whether a first distance between a first center of the text region 212-3 and a center of another region is below a distance threshold. In some implementations, the distance threshold may be set based on the size of the first text region, for example, five times of the height of the first text region.

Upon determining that the distance is below the distance threshold, the feature extraction module 410 may proceed with extracting feature representations from the pair of text regions. Otherwise, the pair of text regions may be ignored accordingly.

For example, with regard to text region 212-3 in FIG. 4, the feature extraction module 410 may determine that the distance between a first center of the text region 212-3 and a second center of the text region 212-5 exceeds a distance threshold. Accordingly, the pair of text regions 212-2 and 212-5 may be ignored by the feature extraction module 410. In contrast, as shown in FIG. 4, a distance between centers of the text regions 212-3 and 212-4 is less than the distance threshold, and thus the feature representation of the two text regions may then be extracted by the feature extraction module 410.

In some implementations, the feature extraction module 410 may consider both the size difference and the distance. In the example of using FPN to generate different scales of feature maps as show in FIG. 3, the feature extraction module 410 may only consider pairs of text regions which are detected from a same pyramid level and a distance between whose centers is less than the distance threshold. For example, as shown in the example of FIG. 4, two pairs of text regions (text regions 212-3 and 212-4, and text regions 212-4 and 212-5) are to be considered by the feature extraction module 410.

With the first and second text regions selected, the feature extraction module 410 may then extract a first feature representation from the first text region and a second feature representation from the second text region. In some implementations, the first and second feature representations may comprise image feature representations. For example, the feature extraction module 410 may obtain the first and second feature representations from the feature maps 325 generated by the FPN 310 as shown in FIG. 3.

Alternatively, the first and second feature representations may comprise semantic feature representations. The feature extraction module 410 may first recognize at least the first and second text elements included in the first and second regions using any proper image-based text recognition technology. The feature extraction module 410 may then generate a first semantic feature representation and a second semantic feature representation based on the recognized first and second text elements therein, for example by using the word2vec technology. It should be appreciated that any approaches for text semantic feature representation generation, either existing or to be developed in the future, can be employed to generate the semantic feature representation of the recognized representations. By using semantic feature representations, the solution according to implementations of the disclosure may detect accurately a text line in which the text elements are not very spatially correlated but quite semantically correlated.

As shown in the example of FIG. 4, the feature extraction module 410 may extract a first feature representation 420 from the first text region 212-3 and a second feature representation 425 from the second text region 212-4. In some implementations, the feature extraction module 410 may then combine the first and second feature representations into a combined feature representation 435.

The combined feature representation 435 may then be provided to the relation prediction model 440. The relation prediction model 440 is configured to determine the link relationship 222 between the first and second text regions based on the combined feature representation 435. The relation prediction model 440 can be any proper type of machine leaning models, examples of which may include a Gradient Boosting Decision Tree (GBDT) model, a Support Vector Machine (SVM), a Random Forest, a neural network, and/or the like.

During the training of the relation prediction model 440, multiple positive training samples and negative training samples may be applied. In some implementations, a positive training sample may be generated by selecting a pair of text regions which are located in a known text line, which for example are identified by a user. The negative training sample may be generated by selecting a pair of text regions which are identified as being located in two known different text lines. During the training period, the feature presentations may be extracted from the pair of text regions included in the training samples and are then input into the relation prediction model. The parameters of the relation prediction model could be adjusted round by round for causing the prediction result to be close to the ground-truth of the training samples.

In some implementations, the feature extraction module 410 may further extract a third feature representation 430 based on both the first and second text regions. For example, the link relationship determination module 220 may extract the third feature representation 430 by determining a spatial relationship between the first and second text regions. In some implementations, the feature extraction module 410 may first determine a first set of coordinates associated with the first text region and a second set of coordinates associated with the second text region. For example, the first and second sets of coordinates may comprise the respective coordinates of the bounding boxes of the first and second regions in the image 170.

The feature extraction module 410 may further determine the third feature representation 430 based on the first and second sets of coordinates. For example, the third feature representation may be a vector of 18 dimensions concatenating a 6-d vector, each indicating the difference of first and second text regions. The 6-d vector may for example comprise ($t_x^{SO}$, $t_y^{SO}$, $t_w^{SO}$, $t_h^{SO}$, $t_x^{OS}$, $t_y^{OS}$), where each dimension is given by:

$$t_x^{SO}=(x^S-x^O)/w^S, \quad t_y^{SO}=(y^S-y^O)/h^S,$$

$$t_w^{SO}=\log(w^S/w^O), \quad t_h^{SO}=\log(h^S/h^O),$$

$$t_x^{OS}=(x^O-x^S)/w^O, \quad t_y^{OS}=(y^O-y^S)/h^O, \qquad (1)$$

where $x^S$ and $y^S$ denote the coordinates of the center of the first text region, $w^S$ and $h^S$ denote the width and height of the first text region, $x^O$ and $y^O$ denote the coordinates of the center of the second text region, and $w^O$ and $h^O$ denote the width and height of the second text region.

Alternatively, the third feature representation 430 may also be determined by extracting features from a third text region bounding at least the first and second text regions. Continuing with the example shown in FIG. 4, the feature extraction module 410 may first determine a third text region 415 based on the first and second text regions 212-3 and 212-4. The third text region 415 bounds both the first and second text regions 212-3 and 212-4, as shown in FIG. 4.

Further, the feature extraction module 410 may then extract the third representation 430 from the determined third text region 415. In some implementations, the third feature representation 430 may be an image feature representation extracted from the third text region 415 in the image. Alternatively, the third feature representation 430 may be a semantic feature representation extracted from the third text region 415. The process of extracting the third feature representation 430 could be performed with reference to the process of extracting the first and second feature representations 420 and 425 from the first and second text regions as discussed above, which will not be discussed in detail here.

As shown in FIG. 4, in the example of extracting the third feature representation 430, the extracted first, second and third feature representations 420, 425 and 430 may be further concatenated together to be a combined feature representation 435, and are then provided to the relation prediction model 440 for determining the link relationship 222 between the first and second text regions 212-3 and 212-4. It should be understood that, during the training period of the relation prediction model 440, the input to the model should further include a third feature representation generated from the pair of text regions included in the training samples. By considering the further third feature representation 430 during the prediction of the relation prediction model 440, a more accurate prediction result could be determined.

Through the method discussed above, by predicting the link relationship using the feature representations extracted from the text regions, the solution according to implementations of the disclosure may improve the accuracy of relationship determination. For example, as compared to a traditional image segmentation based text line detection solution, the solution according to implementations of the disclosure may accurately determine a text line in which two text regions are located with a relative large distance.

Moreover, in some implementations, both the image and semantic feature representations can be considered during the link relationship determination. This would facilitate the determination of the link relationship of two text regions which are semantically related, though the text regions are not very spatially correlated. For example, a user may sign his/her name after a printed word "Name" on a paper, and the signed name may be a bit far from the printed word "Name" and not exactly aligned with the word "Name". Incorporating the semantic feature representation would facilitate identifying that the signed name and the word "Name" are located in a same line.

Text Line Region Determination

Figure 5:
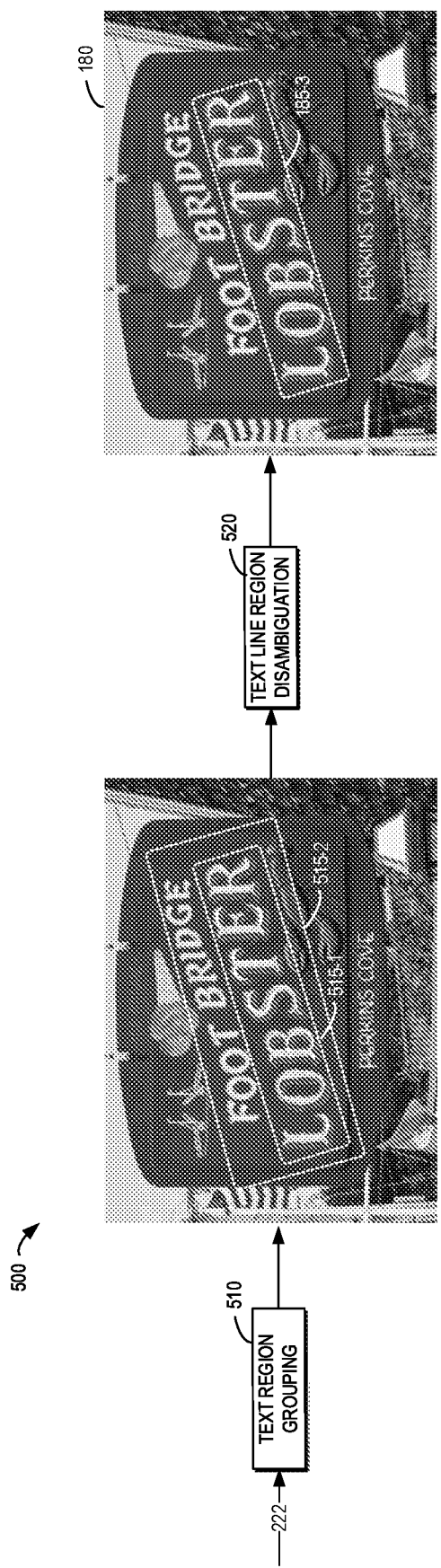
FIG. 5 illustrates an example structure of the text line region determination according to an implementation of the subject matter described herein.

The link relationship 222 between each of the pairs of text regions 212 included in the image may be further provided to the text line region determination module 230. The text line region determination module 230 is configured to determine the text line region 185 based on the link relationship 222. The process of the text line region determination will now be discussed with reference to FIG. 5. FIG. 5 illustrates an example structure 500 of the text line region determination module 230 according to an implementation of the subject matter described herein.

As shown, the text line region determination module 230 includes a text region grouping module 510 configured to group the text regions 212 into different sets based on the link relationship 222 for determining one or more candidate text line regions, and a text line region disambiguation module 520 configured to disambiguate a number of overlapped candidate text line regions.

In some implementations, the text region grouping module 510 may receive the link relationship 222 and group the text regions 212 into different sets accordingly. For example, if the link relationship indicates that the text regions 212-3 and 212-4 are related to a same text line and the text regions 212-4 and 212-5 are related to a same text line, the text region grouping module 510 may group the text regions 212-3, 212-4, and 212-5 into a same set.

The text region grouping module 510 may then determine a candidate text line region 185 based on the grouped sets of text regions. In some implementations, the text region grouping module 510 may determine a candidate text line region bounding at least text regions in the image which are grouped into a same set of text regions. For example, the text region grouping module 510 may determine a candidate text line region 515-1 based at least in part on coordinates of bounding boxes of the text regions 212-3, 212-4, and 212-5 as well as other text regions which are grouped into a same set of text regions as them.

The determined candidate text line region(s) are provided to the text line region disambiguation module 520. In some implementations, multiple scale-specific text region prediction modules (e.g., scale-specific text region prediction modules 330) are used, and therefore a number of overlapped candidate text line regions may be determined against a same text line. As shown in FIG. 5, two candidate text line regions 515-1 and 515-2 (individually or collectively referred to as candidate text line region 515) are determined by the text region grouping module 510. To avoid generating multiple overlapped text line regions for a same text line, the text line region disambiguation module 520 may determine a final text line region from the candidate text line regions 515.

For example, with regarding to a candidate text line region 515-1, the text line region disambiguation module 520 may further select a candidate text line region 515-2 in the image 170. In some embodiments, the text line region disambiguation module 520 may select the candidate text line region 515-2 according to a determination that an overlapped area between the candidate text line regions 515-1 and 515-2 exceeds an area threshold. Alternatively, the text line region disambiguation module 520 may select the candidate text line region 515-2 according to a determination that a ratio of overlapped area between the candidate text line regions 515-1 and 515-2 to the union area of the candidate text line regions 515-1 and 515-2 exceeds a ratio threshold.

In some embodiments, the text line region disambiguation module 520 may disambiguate the two candidate text line regions 515-1 and 515-2 based on their respective scores. As discussed above, each text region may be assigned with a score by the text region prediction module 330 for indicating a possibility that the text region includes a portion of at least a text element. The score of a candidate text line region may be determined as the scores of the text regions included in the candidate text line region. Further, the text line region disambiguation module 520 may only provide the candidate text line region with a higher score.

Alternatively, the text line region disambiguation module 520 may apply a further relation prediction model to disambiguate the two candidate text line regions 515-1 and 515-2. Similar to the process with reference to FIG. 3, the text line region disambiguation module 520 may extract feature representations from the two candidate text line regions 515-1 and 515-2, respectively. It should be understood that the process of extracting the fourth and fifth feature representations may be performed with reference to technology of extracting the first and second feature representations as discussed above, which will not be discussed in detail here.

In some implementations, the text line region disambiguation module 520 may further determine a sixth feature representation based on both of the text line regions 515-1 and 515-2. The process of determining the sixth feature representation may be performed with the process of determining the third feature representation 430 as discussed above with reference to FIG. 3. Similar to the process in FIG. 3, a combination of the fourth, fifth and sixth feature representations can be provided to the relation prediction model included in the text line region disambiguation module 520 for determining which of the candidate text line region 515-1 and 515-2 is to be provided. The relation prediction model included in the text line region disambiguation module 520 can be any proper type of machine leaning models, examples of which may include a Gradient Boosting Decision Tree (GBDT) model, a Support Vector Machine (SVM), a Random Forest, a neural network, and/or the like.

With regarding to the training of the relationship prediction model included in the text line region disambiguation module 520, the training samples may be generated by selecting a pair of text line regions, wherein an overlapped area between the pair of text line regions exceeding an area threshold, and the ground-truth for training may be a choice of a user for a more accurate text line region.

In some implementations, in accordance with a determination that the candidate text line region 515-1 is to be provided, the text line region disambiguation module 520 may only provide the text line region 185-3 (the candidate text line region 515-1) in the image without providing the candidate text line region 515-2. In this way, the solution according to the implementations of the disclosure may provide a more accurate text line region, thereby avoiding providing duplicated text line regions against a same text line.

In some embodiments, the text line region disambiguation module 520 may generate a file comprising the coordinates of bounding box for each of the determined text line regions 185. In some implementations, the text line region disambiguation module 520 may also generate an updated image 180 with the text line region 515-1 being highlighted. In this way, the determined text line region 185 could be clearly presented, for example, to a user for confirming whether the text line detection is accurate.

Example Process

Figure 6:
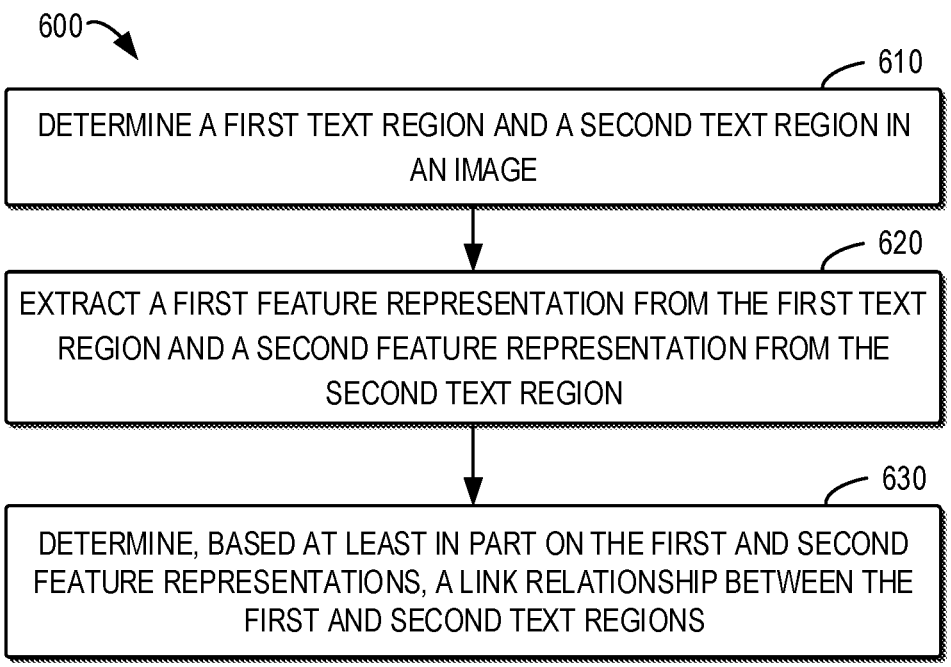
FIG. 6 illustrates a flowchart of a process for providing text line region according to an implementation of the subject matter described herein.

FIG. 6 illustrates a flowchart of a process 600 of text line detection according to some implementations of the subject matter as described herein. The process 600 may be implemented by the computing device 100, for example, by the text line detection module 122 in the computing device 110. The process 600 may also be implemented by any other devices or device clusters similar to the computing device 100. For purpose of description, the process 600 is described with reference to FIG. 1.

At block 610, the computing device 100 determines a first text region and a second text region in an image, wherein the first text region comprises a first portion of at least a first text element and the second text region comprising a second portion of at least a second text element. At block 620, the computing device 100 extracts a first feature representation from the first text region and a second feature representation from the second text region, wherein the first and second feature representations comprises at least one of an image feature representation or a semantic feature representation. At block 630, the computing device 100 determines, based at least in part on the first and second feature representations, a link relationship between the first and second text regions, wherein the link relationship indicates whether the first and second portions of the first and second text elements are located in a same text line.

In some implementations, determining the first and second text regions comprises: identifying a plurality of text regions from the image; and selecting the first and second text regions from the plurality of text regions in accordance with at least one of the following: a determination that a difference between a first size of the first text region and a second size of the second text region is below a size threshold, or a determination that a first distance between a first center of the first text region and a second center of the second text region is below a distance threshold.

In some implementations, determining a link relationship between the first and second text regions comprises: extracting a third feature representation indicating at least one of the following: a spatial relationship between the first and second text regions or a semantic relationship between the first and second text elements; and determining the link relationship further based on the third feature representation.

In some implementations, extracting the third feature representation comprises: determining a third text region bounding at least the first and second text regions; and extracting the third feature representation from the third text region.

In some implementations, determining the third feature representation comprises: obtaining a first set of coordinates associated with the first text region and a second set of coordinates associated with the second text region; and determining the third feature representation based on the first and second sets of coordinates.

In some implementations, the method further comprises: in accordance with the link relationship indicating that the at least one portion of the text element in the first text region and the at least one portion of the text element in the second text region are located in the same text line, determining a first text line region bounding at least the first and the second text regions in the image; and providing the first text line region.

In some implementations, providing the first text line region comprises: determining a second text line region in the image, an overlapped area between the first and second text line regions exceeding an area threshold; extracting a fourth feature representation from the first text line region and a fifth feature representation from the second text line region; determining, using a further machine learning model and based at least in part on the fourth and fifth feature representations, whether the first text line region is to be provided; and in accordance with a determination that the first text line region is to be provided, providing the first text line region in the image without providing the second text line region.

In some implementations, providing the first text line region comprises: highlighting the first text line region in the image.

In some implementations, the first text element comprises at least one of a character, or a symbol.

Example Implementations

Some example implementations of the subject matter described herein are listed below.

In a first aspect, the subject matter described herein provides a computer-implemented method. The method comprises determining a first text region and a second text region in an image, the first text region comprising a first portion of at least a first text element and the second text region comprising a second portion of at least a second text element; extracting a first feature representation from the first text region and a second feature representation from the second text region, the first and second feature representations comprising at least one of an image feature representation or a semantic feature representation; and determining, using a machine learning model and based at least in part on the first and second feature representations, a link relationship between the first and second text regions, the link relationship indicating whether the first portion of the first text element and the second portion of the second text element are located in a same text line.

In some embodiments, extracting a first feature representation from the first text region and a second feature representation from the second text region comprises: recognizing at least the first text element from the first text region and at least the second text element from the second text region; and generating a first semantic feature representation based on the recognized first text element and a second semantic feature representation based on the recognized second text element.

In some implementations, determining the first and second text regions comprises: identifying a plurality of text regions from the image; and selecting the first and second text regions from the plurality of text regions in accordance with at least one of the following: a determination that a difference between a first size of the first text region and a second size of the second text region is below a size threshold, or a determination that a first distance between a first center of the first text region and a second center of the second text region is below a distance threshold.

In some implementations, determining a link relationship between the first and second text regions comprises: extracting a third feature representation indicating at least one of the following: a spatial relationship between the first and second text regions or a semantic relationship between the first and second text elements; and determining the link relationship further based on the third feature representation.

In some implementations, extracting the third feature representation comprises: determining a third text region bounding at least the first and second text regions; and extracting the third feature representation from the third text region.

In some implementations, determining the set of relation features comprises: obtaining a first set of coordinates associated with the first text region and a second set of coordinates associated with the second text region; and determining the third feature representation based on the first and second sets of coordinates.

In some implementations, the method further comprises: in accordance with the link relationship indicating that the at least one portion of the first text element in the first text region and the at least one portion of the second text element in the second text region are located in the same text line, determining a first text line region bounding at least the first and the second text regions in the image; and providing the first text line region.

In some implementations, providing the first text line region comprises: determining a second text line region in the image, an overlapped area between the first and second text line regions exceeding an area threshold; extracting a fourth feature representation from the first text line region and a fifth feature representation from the second text line region; determining, using a further machine learning model and based at least in part on the fourth and fifth feature representations, whether the first text line region is to be provided; and in accordance with a determination that the first text line region is to be provided, providing the first text line region in the image without providing the second text line region.

In some implementations, providing the first text line region comprises: highlighting the first text line region in the image.

In some implementations, the first text element comprises at least one of a character, or a symbol.

In a second aspect, the subject matter described herein provides an electronic device. The electronic device comprises a processing unit; and a memory coupled to the processing unit and having instructions stored thereon which, when executed by the processing unit, cause the electronic device to perform acts comprising: determining a first text region and a second text region in an image, the first text region comprising a first portion of at least a first text element and the second text region comprising a second portion of at least a second text element; extracting a first feature representation from the first text region and a second feature representation from the second text region, the first and second feature representations comprising at least one of an image feature representation or a semantic feature representation; and determining, based at least in part on the first and second feature representations, a link relationship between the first and second text regions, the link relationship indicating whether the first portion of the first text element and the second portion of the second text element are located in a same text line.

In some implementations, extracting a first feature representation from the first text region and a second feature representation from the second text region comprises: recognizing at least the first text element from the first text region and at least the second text element from the second text region; and generating a first semantic feature representation based on the recognized first text element and a second semantic feature representation based on the recognized second text element.

In some implementations, determining a link relationship between the first and second text regions comprises: extracting a third feature representation indicating at least one of the following: a spatial relationship between the first and second text regions or a semantic relationship between the first and second text elements; and determining the link relationship further based on the third feature representation.

In some implementations, extracting the third feature representation comprises: determining a third text region bounding at least the first and second text regions; and extracting the third feature representation from the third text region.

In some implementations, determining the set of relation features comprises: obtaining a first set of coordinates associated with the first text region and a second set of coordinates associated with the second text region; and determining the third feature representation based on the first and second sets of coordinates.

In some implementations, the acts further comprises: in accordance with the link relationship indicating that the at least one portion of the first text element in the first text region and the at least one portion of the second text element in the second text region are located in the same text line, determining a first text line region bounding at least the first and the second text regions in the image; and providing the first text line region.

In some implementations, providing the first text line region comprises: determining a second text line region in the image, an overlapped area between the first and second text line regions exceeding an area threshold; extracting a fourth feature representation from the first text line region and a fifth feature representation from the second text line region; determining, using a further machine learning model and based at least in part on the fourth and fifth feature representations, whether the first text line region is to be provided; and in accordance with a determination that the first text line region is to be provided, providing the first text line region in the image without providing the second text line region.

In some implementations, providing the first text line region comprises: highlighting the first text line region in the image.

In some implementations, the first text element comprises at least one of a character, or a symbol.

In a third aspect, the subject matter described herein provides a computer program product tangibly stored on a computer storage medium and comprising machine-executable instructions which, when executed by a device, cause the device to perform the method according to the aspect in the first aspect. The computer storage medium may be a non-transitory computer storage medium.

In a fourth aspect, the subject matter described herein provides a non-transitory computer storage medium having machine-executable instructions stored thereon, the machine-executable instruction, when executed by a device, causing the device to perform the method according to the aspect in the first aspect.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:
1. A computer-implemented method, comprising:
  determining, using a scene text detection model trained on a plurality of training images comprising text of multiple orientations, fonts, and scales, a first text region and a second text region in an image, the first text region comprising a first portion of at least a first text element and the second text region comprising a second portion of at least a second text element;
  extracting, using a convolutional neural network configured to process multiple color spaces, a first feature representation from the first text region and a second feature representation from the second text region, the first and second feature representations comprising at least one of an image feature representation or a semantic feature representation;

determining, using a semantic information extraction model, a semantic relationship between the first text region and the second text region by performing semantic information extraction on content of the first text element and the second text element using the semantic information extraction model to obtain semantic features representing textual meaning of the first and second text elements;

extracting a third feature representation using the semantic relationship by performing multimodal stitching and fusion on the semantic features of the first and second text elements;

determining, based at least in part on an evaluation of the first feature representation, the second feature representation, and the third feature representation using a relation prediction machine learning model, a link relationship between the first and second text regions, the link relationship indicating whether the first portion of the first text element and the second portion of the second text element are located in a same text line, wherein the relation prediction model is trained using training samples comprising pairs of text regions with known linking relationships;

according to the link relationship indicating that at least a portion of the first text element in the first text region and at least a portion of the second text element in the second text region are located in the same text line, determining a first text line region that at least defines the first text region and the second text region in the image; and outputting, via a display device, the first text line region.

2. The method of claim 1, wherein extracting a first feature representation from the first text region and a second feature representation from the second text region comprises:
   recognizing at least the first text element from the first text region and at least the second text element from the second text region; and
   generating a first semantic feature representation based on the recognized first text element and a second semantic feature representation based on the recognized second text element.

3. The method of claim 1, wherein determining the first and second text regions comprises:
   identifying a plurality of text regions from the image; and
   selecting the first and second text regions from the plurality of text regions in accordance with at least one of the following:
      a determination that a difference between a first size of the first text region and a second size of the second text region is below a size threshold, or
      a determination that a first distance between a first center of the first text region and a second center of the second text region is below a distance threshold.

4. The method of claim 1, wherein determining a link relationship between the first and second text regions comprises:
   extracting a fourth feature representation indicating a semantic relationship between the first and second text elements; and
   determining the link relationship further based on the fourth feature representation.

5. The method of claim 4, wherein extracting the fourth feature representation comprises:
   determining a third text region bounding at least the first and second text regions; and
   extracting the fourth feature representation from the third text region.

6. The method of claim 4, wherein determining the fourth feature representation comprises:
   obtaining a first set of coordinates associated with the first text region and a second set of coordinates associated with the second text region; and
   determining the fourth feature representation based on the first and second sets of coordinates.

7. The method of claim 1, further comprising:
   in accordance with the link relationship indicating that the first portion of the first text element in the first text region and the at least the second portion of the second text element in the second text region are located in the same text line, determining the first text line region as bounding at least the first and the second text regions in the image; and
   providing the first text line region.

8. The method of claim 7, wherein providing the first text line region comprises:
   determining a second text line region in the image, an overlapped area between the first and second text line regions exceeding an area threshold;
   extracting a fourth feature representation from the first text line region and a fifth feature representation from the second text line region;
   determining, based at least in part on the fourth and fifth feature representations, whether the first text line region is to be provided; and
   in accordance with a determination that the first text line region is to be provided, providing the first text line region in the image without providing the second text line region.

9. The method of claim 7, wherein providing the first text line region comprises:
   highlighting the first text line region in the image.

10. The method of claim 1, wherein the first text element comprises at least one of a character or a symbol.

11. An electronic device, comprising:
    at least one processor; and
    a memory coupled to the at least one processor and having instructions stored thereon which, when executed by the at least one processor, cause the electronic device to perform operations to:
       determine, using a scene text detection model trained on a plurality of training images comprising text of multiple orientations, fonts, and scales, a first text region and a second text region in an image, the first text region comprising a first portion of at least a first text element and the second text region comprising a second portion of at least a second text element;
       extract, using a convolutional neural network configured to process multiple color spaces, a first feature representation from the first text region and a second feature representation from the second text region, the first and second feature representations comprising at least one of an image feature representation or a semantic feature representation;
       determine, using a semantic information extraction model, a semantic relationship between the first text region and the second text region by performing semantic information extraction on content of the first text element and the second text element using the semantic information extraction model to obtain semantic features representing textual meaning of the first and second text elements;

extract a third feature representation using the semantic relationship by performing multimodal stitching and fusion on the semantic features of the first and second text elements;

determine, based at least in part on an evaluation of the first feature representation, the second feature representation, and the third feature representation using a relation prediction machine learning model, a link relationship between the first and second text regions, the link relationship indicating whether the first and second portions of the first and second text elements are located in a same text line, wherein the relation prediction model is trained using training samples comprising pairs of text regions with known linking relationships;

according to the link relationship indicating that at least a portion of the first text element in the first text region and at least a portion of the second text element in the second text region are located in the same text line, determine a first text line region that at least defines the first text region and the second text region in the image; and output, via a display device, the first text line region.

12. The electronic device of claim 11, wherein the instructions to extract a first feature representation from the first text region and a second feature representation from the second text region comprises instructions to:

recognize at least the first text element from the first text region and at least the second text element from the second text region; and generate a first semantic feature representation based on the recognized first text element and a second semantic feature representation based on the recognized second text element.

13. The electronic device of claim 11, wherein the instructions to determine the first and second text regions comprises instructions to:

identify a plurality of text regions from the image; and select the first and second text regions from the plurality of text regions in accordance with at least one of the following:
 a determination that a difference between a first size of the first text region and a second size of the second text region is below a size threshold, or
 a determination that a first distance between a first center of the first text region and a second center of the second text region is below a distance threshold.

14. The electronic device of claim 11, wherein the instructions to determine a link relationship between the first and second text regions comprises instructions to:

extract a fourth feature representation indicating a semantic relationship between the first and second text elements; and determine the link relationship further based on the third feature representation.

15. At least one non-transitory machine-readable medium comprising machine-executable instructions which, when executed by a device, cause the device to perform operations to:

determine, using a scene text detection model trained on a plurality of training images comprising text of multiple orientations, fonts, and scales, a first text region and a second text region in an image, the first text region comprising a first portion of at least a first text element and the second text region comprising a second portion of at least a second text element;

extract, using a convolutional neural network configured to process multiple color spaces, a first feature representation from the first text region and a second feature representation from the second text region, the first and second feature representations comprising at least one of an image feature representation or a semantic feature representation;

determine, using a semantic information extraction model, a semantic relationship between the first text region and the second text region by performing semantic information extraction on content of the first text element and the second text element using the semantic information extraction model to obtain semantic features representing textual meaning of the first and second text elements;

extract a third feature representation using the semantic relationship by performing multimodal stitching and fusion on the semantic features of the first and second text elements;

determine, based at least in part on an evaluation of the first feature representation, the second feature representation, and the third feature representation using a relation prediction machine learning model, a link relationship between the first and second text regions, the link relationship indicating whether the first and second portions of the first and second text elements are located in a same text line, wherein the relation prediction model is trained using training samples comprising pairs of text regions with known linking relationships;

according to the link relationship indicating that at least a portion of the first text element in the first text region and at least a portion of the second text element in the second text region are located in the same text line, determine a first text line region that at least defines the first text region and the second text region in the image; and output, via a display device, the first text line region.

16. The at least one non-transitory machine-readable medium of claim 15, wherein the instructions to extract a first feature representation from the first text region and a second feature representation from the second text region comprises instructions to:

recognize at least the first text element from the first text region and at least the second text element from the second text region; and generate a first semantic feature representation based on the recognized first text element and a second semantic feature representation based on the recognized second text element.

17. The at least one non-transitory machine-readable medium of claim 15, wherein the instructions to determine the first and second text regions comprises instructions to:

identify a plurality of text regions from the image; and select the first and second text regions from the plurality of text regions in accordance with at least one of the following:
 a determination that a difference between a first size of the first text region and a second size of the second text region is below a size threshold, or
 a determination that a first distance between a first center of the first text region and a second center of the second text region is below a distance threshold.

18. The at least one non-transitory machine-readable medium of claim 15, wherein the instructions to determine a link relationship between the first and second text regions comprises instructions to:

extract a fourth feature representation indicating a semantic relationship between the first and second text elements; and determine the link relationship further based on the third feature representation.

19. The at least one non-transitory machine-readable medium of claim 18, wherein the instructions to extract the fourth feature representation comprises instructions to:

determine a third text region bounding at least the first and second text regions; and extract the fourth feature representation from the third text region.

20. The at least one non-transitory machine-readable medium of claim 18, wherein the instructions to determine the fourth feature representation comprises instructions to:

obtain a first set of coordinates associated with the first text region and a second set of coordinates associated with the second text region; and determine the fourth feature representation based on the first and second sets of coordinates.

\* \* \* \* \*